H. DASH.
GASOLENE TANK FOR AUTOMOBILES.
APPLICATION FILED JUNE 10, 1918.
1,287,904.
Patented Dec. 17, 1918.
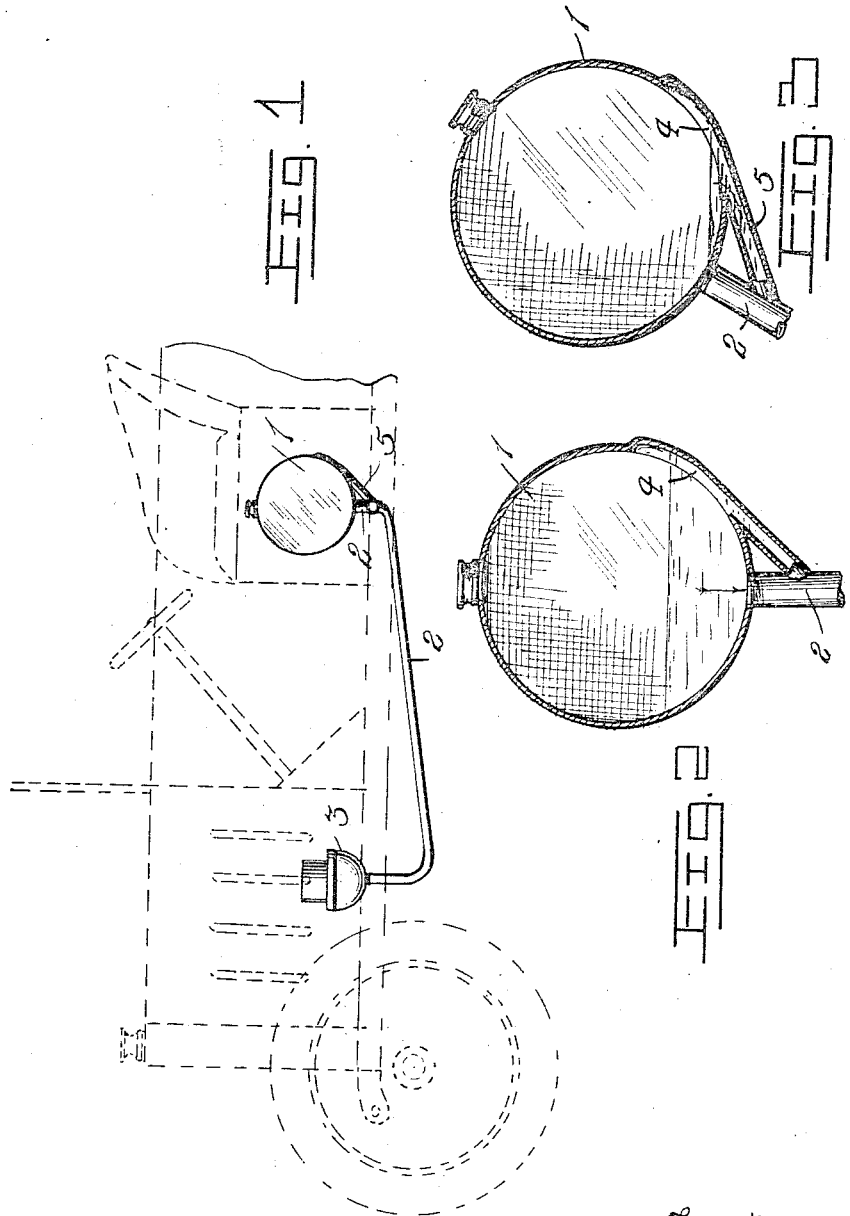
Inventor
Harry Dash
By
Attorneys

UNITED STATES PATENT OFFICE.

HARRY DASH, OF HILLESDEN, VIA BROADVIEW, SASKATCHEWAN, CANADA.

GASOLENE-TANK FOR AUTOMOBILES.

1,287,904.  Specification of Letters Patent.  Patented Dec. 17, 1918.

Application filed June 10, 1918. Serial No. 239,121.

*To all whom it may concern:*

Be it known that I, HARRY DASH, a subject of the King of Great Britain, residing at Hillesden, via Broadview, Province of Saskatchewan, Canada, have invented certain new and useful Improvements in Gasolene-Tanks for Automobiles; and I do hereby declare that the following is a full, clear, and exact description of the invention, such as will enable others skilled in the art to which it appertains to make and use the same.

The present invention relates to gasolene tanks for automobiles and the like, and an object of the present invention is to provide a tank of this character which will cause the gasolene to be supplied to the carbureter of the engine of the automobile when traveling up a steep grade when only a small amount of gasolene is in the tank.

With the above and other objects in view which will hereinafter appear as the description continues, the invention consists of the novel features of construction, combination and formation of parts as will be hereinafter more fully described and particularly pointed out in the appended claim.

In the accompanying drawings:

Figure 1 represents an automobile having one embodiment of the invention applied thereto;

Fig. 2 is a vertical section through the gasolene tank when in its normal position; and, Fig. 3 is a similar view showing the position of the tank when the automobile has undertaken to climb a grade.

The numeral 1 indicates an ordinary gasolene tank which is mounted in any preferred or well known manner upon the frame of the automobile and leading from the bottom of this tank 1 is the usual outlet or feed pipe 2 which supplies the gasolene to the carbureter 3 of the engine of the automobile. If the tank 1 of the automobile is full of gasolene the gas will flow to the carbureter of the engine whether the machine is traveling over level ground or climbing a steep grade. However when only a small amount of gasolene is in the tank 1 and the machine is climbing a steep grade, the tank will assume the position as shown in Fig. 3 of the drawings and the gasolene will rest at one side of the outlet pipe 2, whereby no gasolene is permitted to escape from the tank and thereby cutting off the fuel supply to the engine of the automobile. By arranging an elongated outlet 4 at one side of the tank and having this outlet in communication with the pipe 2 through an auxiliary pipe 5 the gasolene will be permitted to flow into the pipe 2 although there be only a small amount of gasolene within the tank 1.

By providing a tank of this character all of the gasolene contained within the tank will be readily fed to the carbureter of the engine whether the automobile is traveling over level ground or climbing a steep grade.

Having thus fully described my invention, what I claim as new and desire to secure by Letters Patent is:

In a device of the character described comprising a tank, an outlet pipe leading from the lower end of said tank, one side of said tank having an elongated outlet opening formed therein, and an auxiliary pipe forming a means of communication between said elongated outlet opening and said outlet pipe substantially as and for the purpose specified.

In witness whereof I have hereunto set my hand.

HARRY DASH.

Copies of this patent may be obtained for five cents each, by addressing the "Commissioner of Patents, Washington, D. C."